United States Patent [19]

Dang Vu et al.

[11] Patent Number: 4,847,000

[45] Date of Patent: Jul. 11, 1989

[54] PROCESS FOR MANUFACTURING SYNTHESIS GAS OR HYDROGEN BY CATALYTIC CONVERSION OF METHANOL IN THE LIQUID PHASE

[75] Inventors: Quang Dang Vu, Neuilly; Daniel Durand; Jean-Francois Le Page, both of Rueil Malmaison; Philippe Courty, Houilles; Alain Forestiere, Vernaison, all of France

[73] Assignee: Institut Francais du Petrole, Rueil-Malmaison, France

[21] Appl. No.: 156,879

[22] Filed: Feb. 18, 1988

[30] Foreign Application Priority Data

Feb. 19, 1987 [FR] France ................................. 87 02355

[51] Int. Cl.$^4$ .............................................. C01B 3/22
[52] U.S. Cl. .................................................... 252/373

[58] Field of Search ........................ 252/373; 48/648.1

[56] References Cited

U.S. PATENT DOCUMENTS

| | | | |
|---|---|---|---|
| 3,650,713 | 3/1972 | Chinchen et al. | 252/373 |
| 3,920,716 | 11/1975 | Spitz et al. | 252/373 |
| 4,316,880 | 2/1982 | Jockel et al. | 252/373 |
| 4,552,861 | 11/1985 | Courty et al. | 502/303 |
| 4,596,782 | 6/1986 | Courty et al. | 502/303 |

*Primary Examiner*—Howard T. Mars
*Attorney, Agent, or Firm*—Millen, White & Zelano

[57] ABSTRACT

Process for manufacturing synthesis gas or hydrogen by catalytic conversion of methanol in the liquid phase, comprising simultaneously passing methanol (1), a liquid phase of hydrocarbons (6) and optionally water on the catalyst (9).

16 Claims, 1 Drawing Sheet

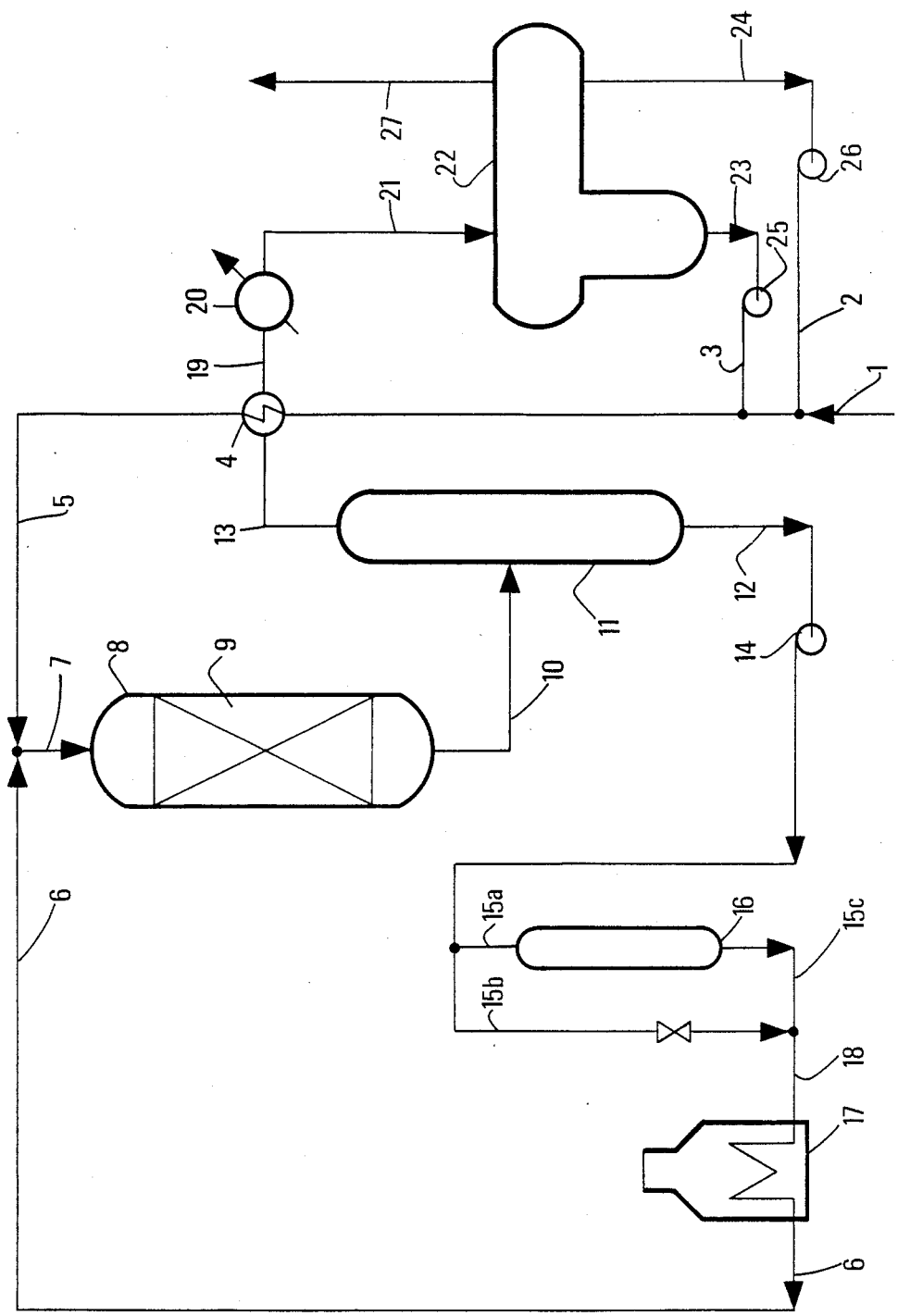

PROCESS FOR MANUFACTURING SYNTHESIS GAS OR HYDROGEN BY CATALYTIC CONVERSION OF METHANOL IN THE LIQUID PHASE

BACKGROUND OF THE INVENTION

This invention relates to an improved process for manufacturing synthesis gas or hydrogen by catalytic conversion of methanol.

SUMMARY OF THE INVENTION

This process for instance is for the production of a synthesis gas essentially composed of a mixture of hydrogen, carbon monoxide and carbon dioxide in variable proportions, or raw hydrogen the main impurity of which is carbon dioxide.

It is well-known that methanol is manufactured from a synthesis gas consisting of a mixture of hydrogen and carbon oxides, in accordance with the limited and reversible equations below:

$$CO + 2H_2 \rightleftharpoons CH_3OH \quad (1)$$

$$CO_2 + 3H_2 \rightleftharpoons CH_3OH + H_2O \quad (2)$$

On the contrary, if there is a local and limited need for synthesis gas, one can start from a liquid methanol reserve in order to avoid a bulky and costly gas storage and crack the alcohol by making it run in the reverse order in comparison to that of equations (1) and (2) above.

Thus, in 1967, in order to feed a fuel cell, the applicant perfected a device for the manufacturing of hydrogen gas based on this principle (FR-1599852 and FR-1549206).

Other variants have been put forward since (U.S. Pat. No. 4316880, JA-59128202, FR-2490615 and FR-2572880).

The reforming process is performed at a temperature going from 120° to 400° C., preferably from 170° to 350° C., under a pressure of 0.1-20 MPa, preferably 0.5-10 MPa.

The reaction catalyst may be a solid catalyst generally used for the high pressure synthesis of methanol (Cr-Zn), or the low pressure synthesis, i.e. copper combined with one or several other elements such as zinc, aluminum and/or chromium, in the form of mixed oxides or a mixture of constituent single oxides in various proportions.

For the reforming, this basic mixture may preferably be activated by adding other elements such as iron, manganese or cobalt (U.S. Pat. Nos. 4552861 and 4596782).

The catalysts can be conditioned either as mass elements, that are composed of active elements oxides, or as supported elements. In the latter case, the binders or the supports may be, for example, silica, alumina, a mixture of these two materials or a more complex material such as spinel structure aluminates (magnesium, zinc, iron or cobalt aluminates) or perovskite structure aluminates (rare-earth aluminates with an atomic number from 57 to 71), or they can be composed of zircon-based mixed oxides ($ZrO_2$-MgO, $ZrO_2$-rare earth, etc.).

Such catalysts have already been described in the patents mentioned above.

Referring to equation (1), it seems that the cracking of methanol can be achieved in a totally anhydrous way and one should be able to obtain a mixture of hydrogen and pure carbon monoxide. In the absence of water, some catalysts unfortunately lead to the formation of by-products, mainly dimethylether, methane and other hydrocarbons, and methyl formate, following the equations below:

$$2CH_3OH \rightleftharpoons CH_3-O-CH_3 + H_2O$$

$$4CH_3OH \rightleftharpoons 3CH_4 + CO_2 + 2H_2O$$

$$CH_3OH + CO \rightleftharpoons H-CO-OCH_3$$

Adding water to the original methanol causes the process to be more selective and increases the hydrogen efficiency by CO conversion, following the equation below $$CO + H_2O \rightleftharpoons CO_2 + H_2$$

However, it is possible to produce a synthesis gas with a molar ratio $H_2/CO$ as close as possible to 2 (stoichiometric ratio of the methanol decomposition) by decomposition of virtually anhydrous methanol (water content smaller than 1,000 p.p.m.) in the presence of a catalyst that essentially contains the elements chromium and zinc in oxide form.

On the contrary, if one wishes to increase the hydrogen efficiency, it is recommended to use a copper-based catalyst with molar ratios $H_2O/CH_3OH$ from 0.05 to 10, preferably 0.1–5.

It is generally observed that the catalysts which are used in the gaseous phase for producing hydrogen ($3H_2 + CO_2$) or synthesis gas ($CO + CO_2 + H_2$) tend to progressively lose their activity and/or their mechanical properties.

It has been proved that, if the cracking of methanol is performed in the presence of a hydrocarbon liquid phase, an outstanding catalyst running stability can be obtained.

The process of this invention thus comprises the catalytic conversion of methanol in the presence of a hydrocarbon(s) liquid phase, this liquid phase being composed of a hydrocarbon or a mixture of hydrocarbons. One preferably uses essentially saturated hydrocarbons (n-paraffins or isoparaffins) the specific weight of which ranges from 0.65 (86 degrees API) to 0.90 (25.7 degrees API) and which contain less than 0.01%, preferably less than 0.0005% by weight of sulfur. The reaction product is cooled and the obtained gas which contains hydrogen is separated from the liquid phase that can be recycled.

In the process of this invention, it is preferable that every catalyst particle be in good contact with both the hydrocarbon(s) liquid phase and the methanol, optionally with water if the case arises, methanol and perhaps water being present both in the gaseous state and in the dissolved state in the hydrocarbon(s) liquid phase.

The process of this invention can be implemented with a catalyst in the form of a fine-grained powder, e.g. 1 to 1,000 μm; the hydrocarbons liquid phase then contains the suspended catalyst and is either simply stirred or circulated.

The process can also be performed with a catalyst that has been previously formed, for instance particles with the largest dimension 1-10 mm and preferably 1.5 to 5 mm. The mixture of hydrocarbons liquid phase, methanol and optionally water can either circulate upwards, the catalyst bed being fixed, moving or expanded (ebulliated bed) or downwards, the catalyst bed then being fixed or moving. The latter technology with a fixed bed is a preferred way of achieving the process and can be performed as follows:

Circulating downwards a liquid phase composed of hydrocarbon(s) and a gaseous phase composed of methanol and optionally water, the superficial velocity of the liquid phase going from 0.5 to 20 cm/s, preferably from 1 to 10 cm/s or better from 1.5 to 8 cm/s. The superficial velocity of the gaseous phase ranges from 0.1 to 10 cm/s, preferably from 0.5 to 5 cm/s.

The superficial velocity is the ratio of the flow rate by volume of the liquid or the gaseous phase, in the temperature and pressure conditions that were chosen for the reaction, to the cross-section area of the reactor considered as empty of catalyst.

According to another preferred embodiment, a mixture of hydrocarbons is used in such a way that, under the conditions of the reaction, a substantial fraction (for instance 10–90% by weight) of hydrocarbons is in the liquid phase and another substantial fraction of hydrocarbons (the complement, that is to say 90–10%) is in the vapor phase, the hydrocarbons of the vapor fraction being such that they can at least partially condense when cooling the reaction effluent down to a temperature that allows the condensation of at least a part of the water and the methanol which have not reacted, this temperature depending on the pressure and ranging from about 100° to 150° C. or less, according to the pressure.

In this preferred embodiment, the mixture of water, methanol and hydrocarbons which are partly liquid and partly vaporized are passed on the catalyst, at the temperature and the pressure of the reaction, and the effluent is cooled, so that the water and the methanol that have not reacted and the hydrocarbons condense. The whole condensate(s) or part of it can be recycled while the gaseous phase containing hydrogen is collected.

The higher the pressure, the more profitable this embodiment is. It is thus possible to operate with high conversions, even at such high pressures as 0.5 to 20 MPa, especially 1 to 10 MPa, which have always been considered as unfavorable to the reaction as far as thermodynamics is concerned, and directly obtain hydrogen under high pressure, which is a particularly profitable industrial result. As an example, in the pressure field mentioned above, it is advantageous to use a hydrocarbon cut with a low specific weight, for instance from 0.68 to 0.8 at 20° C.

BRIEF DESCRIPTION OF THE DRAWING

The FIGURE shows a particular embodiment of this invention.

Liquid methanol and water are introduced into pipe 1.

They are caught up with the hydrocarbon condensate (line 2) and the aqueous methanol condensate (line 3).

The whole is preheated and vaporized in exchanger 4.

It then gets out through pipe 5 and is conditioned at the right temperature by direct contact with a recycled solvent flow conveyed through pipe 6.

The obtained mixture runs through pipe 7 and enters reactor 8 containing a fixed bed of catalyst 9.

Catalyst 9, the composition and the nature of which have been previously described, decomposes the methanol and the water into a mixture essentially made of hydrogen and carbon oxides.

According to the water-methanol ratio at the reactor entrance, the ratio between the carbon monoxide and the carbon dioxide at the reactor exit is more or less high, for instance 50–0.01 moles by mole.

The reaction effluent is discharged through pipe 10 and enters the hot separating drum 11.

The liquid hydrocarbon solvent, which is saturated by contact with the effluent gas, gathers in the bottom of 11 and gets out of the vessel through pipe 12.

The gaseous effluent containing methanol and water which have not reacted, as well as solvent vapors, is sent into exchanger 4 through pipe 13.

It is to be noticed that, when justified by the size of the unit, the gas-liquid separation can take place inside reactor 8.

In that case, the bed of catalyst 9 is supported by a grid which clears the reactor bottom.

The liquid gathers in the bottom of 8 and the gas escapes through pipe 13, which is in this case fixed on the side wall of 8.

The liquid hydrocarbon cut which gets out through pipe 12 is taken back by circulating pump 14.

The flow rate of pump 14 cannot be chosen arbitrarily; it is advantageous to operate with a volume ratio of the hot solvent flow rate (line 6) to the secondary liquid methanol flow rate (line 1) of 1 to 1,000, preferably 5–500. With too low a flow rate, the solvent cannot ensure a regular presence in the catalyst bed; on the other hand, with too high a flow rate, it tends to obstruct the reactor and thus reduce the production.

Pump 14 forces the saturated solvent back into pipe 15 which has two branch pipes, 15a and 15b.

Branch pipe 15a runs into the reactor for absorbent masses 16 which contains at least one absorbent mass for collecting sulfur and/or chlorine and/or carbonyl metals. One shall use for example granulated active carbon and/or at least one absorbent mass such as commercial goods C117, C125, C54-8, C8 by Catalysts and Chemicals Europe S.A., ICI 59-3, CCI XC117. The reactor for absorbent masses may also be set in shunt on circuit 5.

The solvent fraction discharged from 16 is passed through pipe 15c and admixed with the other solvent fraction. The whole gets to oven 17 through pipe 18.

The function of oven 17 is to regulate the temperature of the products at the time of their entry in reactor 8.

When it leaves 17, the solvent is passed through pipe 6 and admixed with the products to be reformed coming from line 5.

At the head of drum 11, a gaseous reaction effluent is obtained, which is mainly composed of hydrogen and carbon oxides; there is also methanol and water which have not reacted, as well as solvent vapor.

The gaseous effluent goes through pipe 13, warms up the product coming in through exchanger 4, goes through pipe 19 and enters condenser cooler 20, and finally enters flask 22 through pipe 21.

The condensates leave through pipes 23 and 24 and are respectively taken back by pumps 25 and 26.

The gas containing hydrogen and carbon oxides is carried off through pipe 27. If necessary, the gas can be subjected to complementary purifications, for instance a possible preliminary absorption of solvent vapor traces followed by a selective purification of hydrogen, for exammple by P.S.A. (pressure swing adsorption), or for instance a decarbonatation followed by a methanation, or for instance a possible preliminary absorption followed by a separation of the hydrogen produced by selective diffusion on membranes. One can use to this end either organic membranes (for example those of the PRISM process or of the UBE process) or polymetallic membranes (for example palladium-silver membranes in the mass form or after deposition on an appropriate support).

If the hydrogen is purified with a physical separation process (diffusion on membrane, P.S.A. process), it may be advantageous to use the gaseous drain of the separation unit as a fuel supply in oven 17.

One can recycle a part of the obtained gases if one wishes to; the carbon dioxide which is contained in these gases has a stabilizing effect on the catalyst. One can also use a carbon dioxide that is extraneous to the process in order to stabilize the catalyst.

EXAMPLE 1

(comparative example in the vapor phase)

A tubular reactor with an inside diameter of 36 mm and a height of 3 m is filled with 1 liter of fresh catalyst in the form of pellets (diameter=height=2.5 mm) and with a composition of

| | |
|---|---|
| $CuO$ = 43.61 | |
| $Fe_2O_3$ = 28.89 | % by weight |
| $Cr_2O_3$ = 27.50 | |

The catalyst is reduced according to the operating conditions:

Atmospheric pressure
Increasing temperature from 100° to 280° C. for 24 hours
$H_2$ diluted at 1% (vol.) in nitrogen
Gas space velocity: 1,000 $h^{-1}$ The unit is next pressurized at 4 MPa with nitrogen. A water-methanol stock with a molar ratio water-methanol of 1.5, is injected when the unit temperature reaches 280° C. The liquid stock flow rate is 1.5 liter/hour. One lets the unit work during 40 hours to stabilize its running.

The initial conversion rate (40 hours later) of methanol is 95.6%; it is no more than 88.4% after 300 hours of running at 280° C. The hydrogen yield (%) expressed by the molar ratio:

$$\text{Yield } H_2 = \frac{H_2 \text{ formed} \times 100}{3 \times CH_3OH \text{ converted}}$$

and which remains practically stable for the whole duration of the test is 97.7%.

EXAMPLE 2

This example is intended to show, in comparison to Example 1, the effect which is obtained by using a hydrocarbons liquid phase, namely a greater stability of conversion in the course of time but at the expense of a slight conversion fall. This fall is of little consequence because, by slightly modifying the operating conditions, one can obtain at the same time the same initial conversion as in the gaseous phase and the advantage of a greater conversion stability in the course of time. That is what has been achieved in this example.

Example 1 is repeated up to the unit pressurization at 4 MPa included.

A paraffin cut $C_{14}$-$C_{18}$ is then injected with a flow rate of 100 liters/hour and a temperature rise up to 295° C. When this temperature is reached, the water-methanol stock with a molar ratio $H_2O/CH_3OH=1.5$ is introduced at the rate of 1 liter per hour. The gas superficial velocity ($V_g$) is 1.2 cm/s and the liquid superficial velocity ($V_l$) is 2.8 cm/s. After a 40-hour running at 295° C., the methanol conversion rate is 95.2% (which is nearly the same as in Example 1). After 300 hours, it is 93.1%, which shows a slighter deactivation than in Example 1.

The hydrogen yield, which remains practically stable, is 98.8%.

EXAMPLE 3

The same experiment as in Example 2 is achieved, except for the reduction stage which is performed in the liquid phase as follows:

After the fresh catalyst filling (1 liter) as in Example 1 and the unit pressurization at 4 MPa with nitrogen, the paraffin cut $C_{14}$-$C_{18}$ is injected at a rate of 80 liters/hour. The gaseous mixture flow rate ($H_2$ at 10% by volume in $N_2$) is 1,000 liters/hour; the temperature is then brought to rise progressively up to 240° C. After the reduction stage ($H_2$ consumption nil), the gas feed is cut off and the paraffin cut feed is maintained. The temperature is brought up to 295° C.; the water-methanol stock is introduced when this temperature is reached. The operating conditions are the same as in Example 2; after 40-hour running, the methanol conversion rate is 96.0% and after 300 hours, it is 94.5%.

The hydrogen yield, which remains stable, is 98.9%.

EXAMPLE 4

One proceeds as described below with the equipment and the fresh catalyst (1 liter) of Example 1:

After the catalyst filling and the unit pressurization at 4 MPa, the same paraffin cut $C_{14}$-$C_{18}$ as in Example 2 is injected with a flow rate of 100 liters/hour. The temperature is regulated at 240° C. The water-methanol stock with a molar ratio $H_2O/CH_3OH=1.5$ is then injected with a low flow rate (100 cm$^3$/h) for about 10 minutes while the temperature is progressively increased until it reaches 280° C. When this reduction stage with methanol in the liquid phase is over, the stock flow rate is increased up to 1 liter/hour while introducing simultaneously $CO_2$ at a flow rate of 30 liters/hour.

The performances at 290° C. are the following ($V_g=1.24$ cm/s; $V_l=2.8$ cm/s).

| | after 40 h | after 300 h |
|---|---|---|
| Methanol conversion rate (%) | 93.5 | 92.7 |
| $H_2$ yield | 98.4 | 98.3 |

EXAMPLE 5

Two hundred and twenty-seven liters/hour of aqueous methanol with 36.5% by weight of water are introduced into pipe 1.

About 110 liters/hour of a condensate with 68% by weight of water are added, the rest being essentially composed of unconverted methanol and about 330 liters/hour of a solvent condensate.

The solvent which is employed corresponds to an octane cut with a specific weight of 0.705. The cut flow rate and the catalyst are the same as in Example 2.

The preheated and partly vaporized mixture is brought to about 272° C. by direct contact with the recycled solvent from oven 17. The pressure is 5 MPa.

After passing on the catalyst bed 9, the temperature of the reformed products is 240° C.

These products are introduced into drum 11 in the bottom of which one collects about 7.5 m³/h of recycled solvent. This solvent flow rate is sent by pump 14 half through the adsorbent bed in bottle 16 and half through pipe 15b directly to oven 17 which warms it up so that the reactor entrance always is at a temperature of 270°-272° C.

The gaseous effluent from flask 11 is cooled and the condensates are collected in flask 22. The aqueous condensate corresponds to a methanol conversion of 80%.

EXAMPLE 6

One proceeds in the same conditions as in Example 2 but with a catalyst with the following composition:

| | | |
|---|---|---|
| CuO = | 26.36 | |
| $Al_2O_3$ = | 30.43 | % by weight |
| ZnO = | 43.18 | |
| $Na_2O$ = | 0.03 | | and in the form of pellets with $h = \phi = 2.5$ mm

The performances concerning the hydrogen production by steam reforming are the following:

| | |
|---|---|
| Methanol conversion after 100 hours | 90.1% |
| Hydrogen yield | 98.1% |

EXAMPLE 7

One proceeds as in Example 6 but with 2 liters of catalyst and in the following operating conditions:

| | |
|---|---|
| Pressure | 2.5 MPa |
| Temperature | 285° C. |
| $C_{14}$-$C_{18}$ hydrocarbons flow rate | 100 l/h |
| Water-methanol stock flow rate | 0.5 l/h |
| Stock molar composition | $H_2O/CH_3OH = 0.25$ |
| $v_l$ = | 2.8 cm/s |
| $v_g$ = | 1.42 cm/s |

After a 100-hour running, the performances are the following:

| | |
|---|---|
| Methanol Conversion = | 85.6% |
| $H_2$/CO molar ratio = | 3.25% |

The carbon selectivity:

$$100 \times \frac{(CO + CO_2) \text{ formed}}{CH_3OH \text{ converted}}$$

is 98.8%.

EXAMPLE 8

The reactor described in Example 1 is filled with 1 liter of catalyst with a composition of:

| | | |
|---|---|---|
| $Cr_2O_3$ | | % by weight |
| ZnO | 73.6 | | and with $h = \phi = 2.5$ mm.

After pressurization of the unit at 1 MPa with nitrogen, the hydrocarbon cut $C_{14}$-$C_{18}$ of Example 2 is injected at a flow rate of 80 l/h and the temperature is increased to 310° C. The methanol stock containing 0.09% by weight of water is then introduced at a flow rate of 300 cm³/h (VVH=0.3 h⁻¹) and

| | |
|---|---|
| $v_l$ = | 2.24 cm/s |
| $v_g$ = | 1.57 cm/s |

After a 100-hour running, the performances are the following:

| | |
|---|---|
| Methanol conversion | 98.1% |
| $H_2$/CO molar ratio | 2.15 |
| The carbon selectivity is 97%. | |

We claim:

1. A process for the production of hydrogen and a carbon oxide by catalytic conversion of methanol in the liquid phase wherein methanol is contacted with a solid catalyst at 120°-400° C., comprising simultaneously passing methanol and a hydrocarbon(s) liquid phase on the catalyst, said catalyst consisting essentially of (a) a chromium oxide-zinc oxide catalyst, or (b) a catalyst comprising copper oxide and at least one metal oxide selected from the group consisting of a zinc oxide, an aluminum oxide and a chromium oxide, with the proviso that, when the catalyst is (b), water is present in admixture with the methanol in a water/methanol molar ratio of 0.1-5.

2. A process according to claim 1, wherein said process is carried out in a fixed bed.

3. A process according to claim 1, wherein said catalyst is in the form of a fine grained powder.

4. A process according to claim 3, wherein said catalyst has a particle size of 1 to 1,000 um.

5. A process according to claim 1, wherein the hydrocarbon liquid phase is a saturated hydrocarbon fraction having a specific weight of 0.65 (86 degrees API) to 0.90 (25.7 degrees API).

6. A process according to claim 5, wherein the hydrocarbon feed contains less that 0.01% sulfur.

7. A process according to claim 6, wherein the hydrocarbon feed contains less than 0.0005% sulfur.

8. A process according to claim 1 wherein the catalyst is suspended in the hydrocarbon liquid phase.

9. A process according to claim 1 wherein a hydrocarbon gas phase is also present, the hydrocarbons of the said gas phase being such that they are able to condense at least partly when the reaction product is cooled.

10. A process according to claim 9 wherein the temperature is 170°-350° C. and the pressure 0.1-20 MPa.

11. A process according to claim 10 wherein the pressure is 0.5-10 MPa.

12. A process according to claim 1 wherein the hydrocarbon liquid phase has a specific weight of 0.65-0.90.

13. A process according to claim 1 wherein the hydrocarbon liquid phase has a specific weight of 0.68–0.80.

14. A process according to claim 1 wherein water is in a proportion of 0–1,000 p.p.m. in relation to methanol and the catalyst contains zinc and chromium oxides.

15. A process according to claim 1 wherein the catalyst comprises copper obtained by reduction of copper oxide with hydrogen in the presence of a hydrocarbons liquid phase.

16. A process according to claim 1 wherein the superficial velocity is 0.5–20 cm/s for the hydrocarbons liquid phase and 0.1–10 cm/s for the gaseous phase.

* * * * *